United States Patent
Kuo et al.

(10) Patent No.: US 10,394,061 B2
(45) Date of Patent: Aug. 27, 2019

(54) LIQUID CRYSTAL DISPLAY DEVICE DRIVING METHOD AND LIQUID CRYSTAL DISPLAY DEVICE

(71) Applicant: Shenzhen China Star Optoelectronics Technology Co., Ltd., Shenzhen, Guangdong (CN)

(72) Inventors: Ping-sheng Kuo, Guangdong (CN); Li-wei Chu, Guangdong (CN); Yu-yeh Chen, Guangdong (CN); Jian Gao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 232 days.

(21) Appl. No.: 15/543,035

(22) PCT Filed: Jan. 13, 2017

(86) PCT No.: PCT/CN2017/071152
§ 371 (c)(1),
(2) Date: Jul. 12, 2017

(87) PCT Pub. No.: WO2018/120302
PCT Pub. Date: Jul. 5, 2018

(65) Prior Publication Data
US 2018/0275440 A1    Sep. 27, 2018

(30) Foreign Application Priority Data
Dec. 29, 2016  (CN) .......................... 2016 1 1247062

(51) Int. Cl.
G09G 3/36   (2006.01)
G02F 1/133  (2006.01)
G02F 1/1362 (2006.01)

(52) U.S. Cl.
CPC .... *G02F 1/13306* (2013.01); *G02F 1/136286* (2013.01); *G09G 3/3607* (2013.01);
(Continued)

(58) Field of Classification Search
CPC .......... G09G 3/20; G09G 3/36; G09G 3/3614; G09G 3/3677; G09G 3/2003;
(Continued)

(56) References Cited

U.S. PATENT DOCUMENTS

2014/0368553 A1   12/2014  Chang et al.
2016/0321984 A1*  11/2016  Kim ...................... G09G 3/2096
2017/0270877 A1*  9/2017   Li .............................. G06T 7/13

FOREIGN PATENT DOCUMENTS

CN     101419790 A    4/2009
CN     103065591 A    4/2013
(Continued)

*Primary Examiner* — Chanh D Nguyen
*Assistant Examiner* — Nguyen H Truong
(74) *Attorney, Agent, or Firm* — Andrew C. Cheng

(57) ABSTRACT

The present application discloses a liquid crystal display device driving method and a liquid crystal display device, the driving method including: receiving the image data entered into the timing controller; calculating an area in the display image corresponding to the image data having the coupling phenomenon exceeds a predetermined level; determining whether or not the area in the display image corresponding to the image data having the coupling phenomenon exceeds a predetermined area is greater than or equal to the predetermined area; when the area is greater than or equal to the predetermined area, a two rows inversion manner is adopted, wherein when the method of two rows inversion is adopted to drive the liquid crystal display device, the driving direction of the data signal S(n+2) and the data signal S(n+3) are in contrast at the same time, wherein n is zero or a positive even number.

10 Claims, 5 Drawing Sheets

(52) U.S. Cl.
CPC ......... *G09G 3/3614* (2013.01); *G09G 3/3655* (2013.01); *G09G 3/3688* (2013.01); *G09G 2310/0264* (2013.01)

(58) Field of Classification Search
CPC .......... G09G 3/3696; G09G 5/00; G09G 5/10; G09G 5/02; G02F 1/133; G02F 1/1362; G02F 1/136; G02F 1/1343; G02F 1/3203
See application file for complete search history.

(56) References Cited

FOREIGN PATENT DOCUMENTS

| | | |
|---|---|---|
| CN | 103323996 A | 9/2013 |
| CN | 104392702 A | 3/2015 |
| CN | 104505039 A | 4/2015 |

* cited by examiner

LIQUID CRYSTAL DISPLAY DEVICE DRIVING METHOD AND LIQUID CRYSTAL DISPLAY DEVICE

CROSS REFERENCE

This application claims priority to Chinese Patent Application No. 201611247062.8, entitled "LIQUID CRYSTAL DISPLAY DEVICE DRIVING METHOD AND LIQUID CRYSTAL DISPLAY DEVICE", filed on Dec. 29, 2016, which is incorporated by reference in its entirety.

FIELD OF THE INVENTION

The present application relates to a display technology field, and more particularly to a liquid crystal display device driving method and a liquid crystal display device.

BACKGROUND OF THE INVENTION

In the liquid crystal display device of the Gate Drive On Array, GOA, a low electric level signal Vss of one of the control signals of the GOA circuit has a noise source such as a noise between a gate line and a data line. Referring to FIG. 1, usually, the liquid crystal display device includes the gate line (labeled as Gate line in FIG. 1) and the data line (labeled as Data line in FIG. 1). The gate line and the data line are insulated and interleaved, a thin film transistor (labeled as TFT in FIG. 1) is provided between the gate line and the data line, and a gate of the thin film transistor is electrically connected to the gate line, a drain of the thin film transistor is electrically connected to the data line, a source of the thin film transistor is electrically connected to a liquid crystal capacitor Clc to a common electrode, and the drain of the thin film transistor is electrically connected to a storage capacitor Cst to ground. Therefore, two coupling capacitances are between the gate line and the data line: one of the coupling capacitances is the coupling capacitance Cxl formed between the gate line and the data line, and the other coupling capacitance is node between the gate line and the gate of the thin film transistor, a node between the data line and the drain of the thin film transistor forms a coupling capacitance Cgd. When the data of the data line changes, a noise is generated through the two coupling capacitors in the gate line. When the two data lines corresponding to the gate lines have the same coupling polarities on the gate lines, a larger noise is generated, which leads to a high-frequency mura phenomenon in the image of the liquid crystal display device, and the mura phenomenon tends to deteriorate over time, resulting in deterioration of GOA circuit characteristics with time.

SUMMARY OF THE INVENTION

According to an aspect of the present application, there is provided a liquid crystal display device driving method for driving a liquid crystal display device, the liquid crystal display device driving method including:

receiving the image data entered into the timing controller; calculating an area in the display image corresponding to the image data having the coupling phenomenon exceeds a predetermined level;

determining whether or not the area in the display image corresponding to the image data having the coupling phenomenon exceeds a predetermined area is greater than or equal to the predetermined area;

when the area in the display image corresponding to the image data having the coupling phenomenon exceeds a predetermined level is greater than or equal to the predetermined area, a two rows inversion manner is adopted to drive the liquid crystal display device, wherein when the method of two rows inversion is adopted to drive the liquid crystal display device, the driving direction of the data signal S(n+2) and the data signal S(n+3) are in contrast at the same time, wherein n is zero or a positive even number.

wherein when the area in the display image corresponding to the image data having the coupling phenomenon exceeds a predetermined level is smaller than the predetermined area, a one row inversion manner is adopted to drive the liquid crystal display device, wherein when the method of one row inversion is adopted to drive the liquid crystal display device, the driving direction of the data signal S(n+2) and the data signal S(n+3) are the same at the same time.

wherein the step of "calculating an area in the display image corresponding to the image data having the coupling phenomenon exceeds a predetermined level" including:

calculating the ratio with the same driving direction of the data signal S(n+2) and S(n+3) in the image data at the same time to the total data signal.

wherein the step of "determining whether or not the area in the display image corresponding to the image data having the coupling phenomenon exceeds a predetermined area is greater than or equal to the predetermined area" including:

determining the ratio with the same driving direction of the data signal S(n+2) and S(n+3) in the image data at the same time to the total data signal is greater than or equal to the predetermined ratio.

wherein the step of "when the area in the display image corresponding to the image data having the coupling phenomenon exceeds a predetermined level is greater than or equal to the predetermined area, a two rows inversion manner is adopted to drive the liquid crystal display device" including:

when the ratio with the same driving direction of the data signal S(n+2) and S(n+3) in the image data at the same time to the total data signal is greater than or equal to the predetermined ratio, the liquid crystal display device is driven in two rows inversion manner.

wherein the step of "determining whether or not the area in the display image corresponding to the image data having the coupling phenomenon exceeds a predetermined area is greater than or equal to the predetermined area" including:

determining the ratio with the same driving direction of the data signal S(n+2) and S(n+3) in the image data at the same time to the total data signal is greater than or equal to the predetermined ratio.

wherein the step of "when the area in the display image corresponding to the image data having the coupling phenomenon is smaller than the predetermined area, the liquid crystal display device is driven by one row inversion" including:

when the ratio with the same driving direction of the data signal S(n+2) and S(n+3) in the image data at the same time to the total data signal is smaller than the predetermined ratio, the liquid crystal display device is driven in one row inversion manner.

Comparing to the conventional technology, the driving method of the liquid crystal display device according to the embodiment of the present application when the area in the display image corresponding to the image data having the coupling phenomenon exceeds a predetermined level is greater than or equal to the predetermined area, a two rows inversion manner is adopted to drive the liquid crystal display device, thus leading to the signals that the data signal S(n+2) and the data signal S(n+3) applied to the same gate line are weaken by each other or even completely offset, so that the noise of the gate line is reduced, reducing the mura phenomenon when the liquid crystal display device displaying image, thus reducing the deterioration of GOA circuit characteristics with time.

A liquid crystal display device, wherein the liquid crystal display device including:

a receiving unit is configured to receive image data entered into the timing controller;

a calculation unit is configured to calculate an area in the display image corresponding to the image data with a coupling phenomenon greater than a predetermined level;

a determination unit is configured to determine whether the area exceeds a predetermined level in the display image corresponding to the image data having the coupling phenomenon is greater than or equal to the predetermined area;

a driving unit is configured to when the area in the display image corresponding to the image data having the coupling phenomenon is greater than or equal to the predetermined area, the liquid crystal display device is driven by two rows inversion, wherein when adopting the two rows inversion manner to drive the liquid crystal display device, the driving direction of the data signal S(n+2) and the data signal S(n+3) are in contrast at the same time, wherein n is zero or a positive even number.

wherein the driving unit is further configured to when the area in the display image corresponding to the image data having the coupling phenomenon is smaller than the predetermined area, the liquid crystal display device is driven by one row inversion, wherein when adopting the one row inversion manner to drive the liquid crystal display device, the driving direction of the data signal S(n+2) and the data signal S(n+3) are the same at the same time.

wherein the calculation unit is further configured to calculate the ratio with the same driving direction of the data signal S(n+2) and S(n+3) in the image data at the same time to the total data signal.

wherein the determination unit is further configured to determine the ratio with the same driving direction of the data signal S(n+2) and S(n+3) in the image data at the same time to the total data signal is greater than or equal to the predetermined ratio.

wherein the driving unit is further configured to when the ratio with the same driving direction of the data signal S(n+2) and S(n+3) in the image data at the same time to the total data signal is greater than or equal to the predetermined ratio, the liquid crystal display device is driven in two rows inversion manner.

wherein the determination unit is further configured to determine the ratio with the same driving direction of the data signal S(n+2) and S(n+3) in the image data at the same time to the total data signal is greater than or equal to the predetermined ratio.

wherein the driving unit is further configured to when the ratio with the same driving direction of the data signal S(n+2) and S(n+3) in the image data at the same time to the total data signal is smaller than the predetermined ratio, the liquid crystal display device is driven in one row inversion manner.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention. Embodiments and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
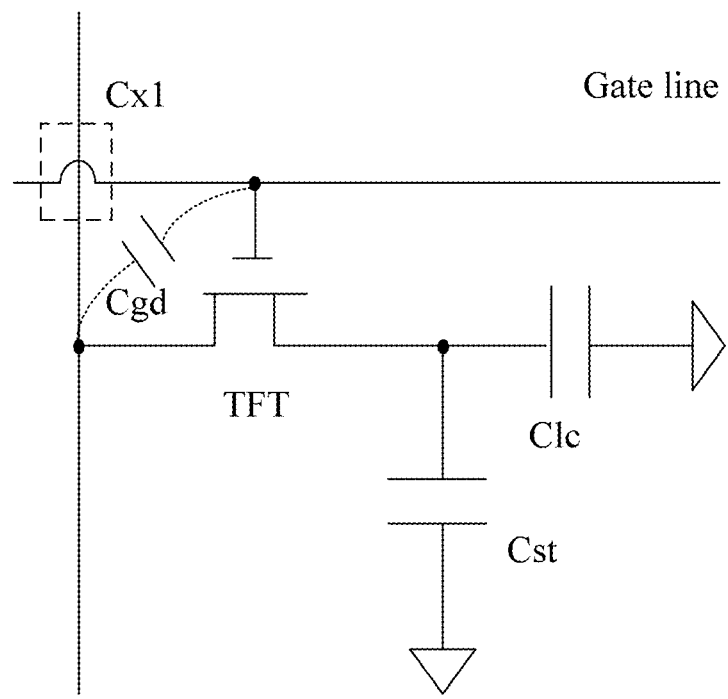
FIG. 1 is a schematic diagram of a driving circuit of a sub-pixel of a liquid crystal display device in a conventional technology.
Figure 2:
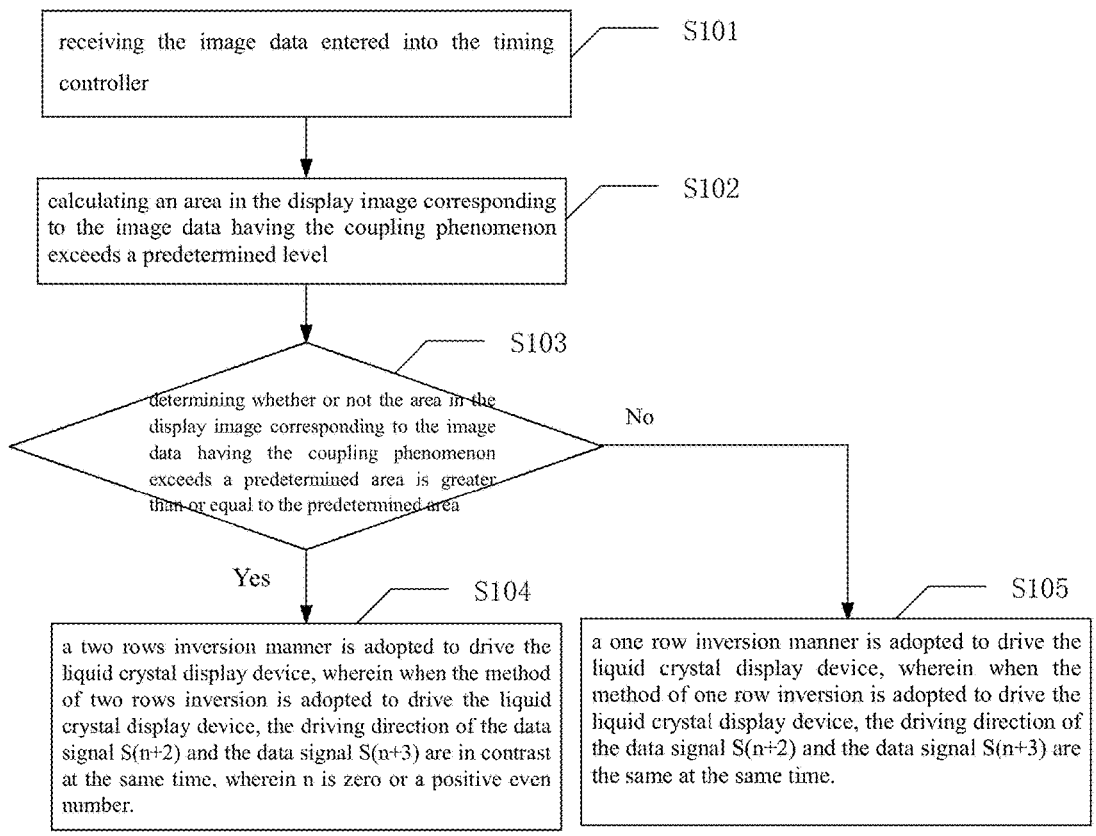
FIG. 2 is a flow-chart of a method for driving a liquid crystal display device according to a preferred embodiment of the present application.

FIG. 2 is a flow-chart of a method for driving a liquid crystal display device according to a preferred embodiment of the present application. The liquid crystal display device driving method of the present application is for driving a liquid crystal display device, which can be but not limited to a smart phone, a mobile Internet device (MID), an e-book, a Play Station Portable, PSP or Personal Digital Assistant, PDA and other electronic devices. The liquid crystal display device driving method includes, but is not limited to the following steps.

Step S101, receiving the image data entered into the timing controller.

Step S102, calculating an area in the display image corresponding to the image data having the coupling phenomenon exceeds a predetermined level. When a coupling display appears in the display image, the display image appears the high-frequency mura (unevenness luminance) phenomenon.

Step S103, determining whether or not the area in the display image corresponding to the image data having the coupling phenomenon exceeds a predetermined level is greater than or equal to the predetermined area. When the area in the display image corresponding to the image data having the coupling phenomenon exceeds a predetermined level is greater than or equal to the predetermined area, it is indicated that the area having the mura phenomenon in the display image corresponding to the image data is too large and have a greater impact on the display image; When the area in the display image corresponding to the image data having the coupling phenomenon exceeds a predetermined level is smaller than the predetermined area, it is indicated that the area having the mura phenomenon in the display image corresponding to the image data is small and have a smaller impact on the display image. When the area in the display image corresponding to the image data having the coupling phenomenon exceeds a predetermined level is greater than or equal to the predetermined area, the process proceeds to step S104. When the area in the display image corresponding to the image data having the coupling phenomenon exceeds a predetermined level is smaller than the predetermined area, the process proceeds to step S105.

Step S104, When the area in the display image corresponding to the image data having the coupling phenomenon exceeds a predetermined level is greater than or equal to the predetermined area, the liquid crystal display device is driven by two rows inversion, wherein when the method of two rows inversion is adopted to driving the liquid crystal display device, the driving direction of the data signal S(n+2) and the data signal S(n+3) are in contrast at the same time, wherein n is zero or a positive even number. When the liquid crystal display device is driven in two rows inversion manner, the directions of the signal that the data signal S(n+2) and the data signal S(n+3) applied to the same gate line are in contrast, resulting the signals applied to the same gate line by the data signal S(n+2) and the data signal S(n+3) are weaken by each other or even completely offset, so that the noise of the gate line is reduced, reducing the mura phenomenon when the liquid crystal display device displaying image.

Figure 3:
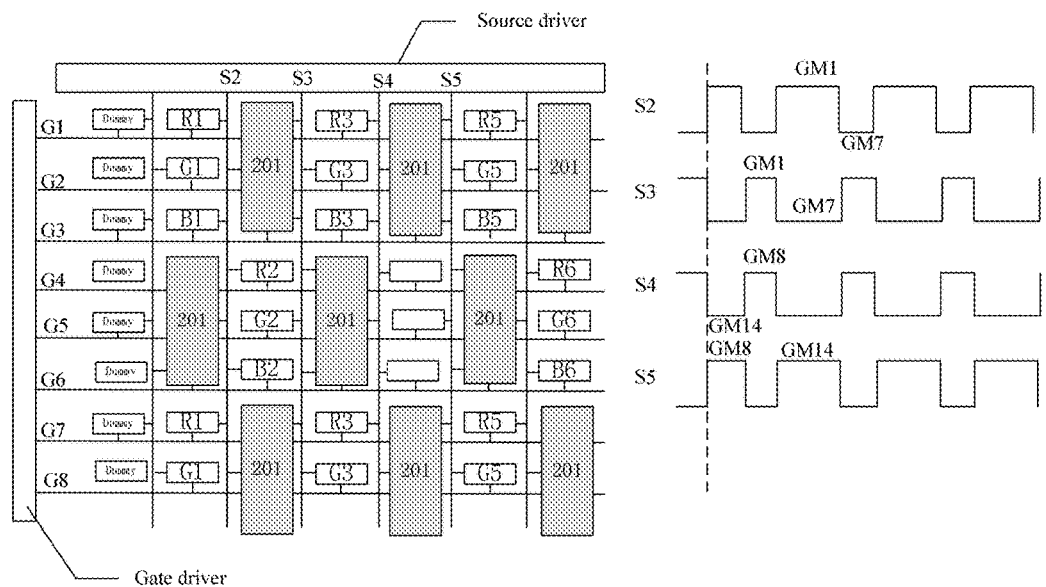
FIG. 3 is a schematic diagram of a liquid crystal display device adopting the method of driven by two rows inversion according to a preferred embodiment of the present application.

Referring to FIG. 3, FIG. 3 is a schematic diagram of a liquid crystal display device adopting the method of driven by two rows inversion according to a preferred embodiment of the present application. The display image illustrated in FIG. 3 is one pixel on-off, i.e., one of the two adjacent pixels is on, the other pixel is off, the pixel in off stage (dark pixel) is illustrated in gray in FIG. 3, and the rest pixels are pixels in on stage (bright pixels). FIG. 3 illustrates a pixel arrangement structure and a partial data signal of the liquid crystal display device, in the pixel arrangement of the present embodiment, one pixel includes one red sub-pixel, one green sub-pixel, and one blue sub-pixel. In FIGS. 3, R1, R2, R3, R4, R5, and R6 are all representing red sub-pixels, G1, G2, G3, G4, G5, and G6 are all representing green sub-pixels, and B1, B2, B3, B4, B5, and B6 are all representing blue sub-pixels. Wherein gray represents dark pixels, and is shown as 201 in the figure for convenience of description. It can be seen in FIG. 3, the driving direction of the data signal S2 and the data signal S3 are in the same direction at the same time, i.e., both the data signal S2 and the data signal S3 are both at high electric level or both at the low electric level at the same time. And it can be seen in FIG. 3, the driving direction of the data signal S4 and the data signal S5 are in the same direction at the same time, i.e., both the data signal S4 and the data signal S5 are both at high electric level or both at the low electric level at the same time. At this time, the direction in which the data signal S(n+2) and the data signal S(n+3) applied to the same gate line (the gate lines are labeled as G1 to G8 in the figure) is in contrast, resulting the signals applied to the same gate line by the data signal S(n+2) and the data signal S(n+3) are weaken by each other or even completely offset, so that the noise of the gate line is reduced, reducing the mura phenomenon when the liquid crystal display device displaying image.

Figure 4:
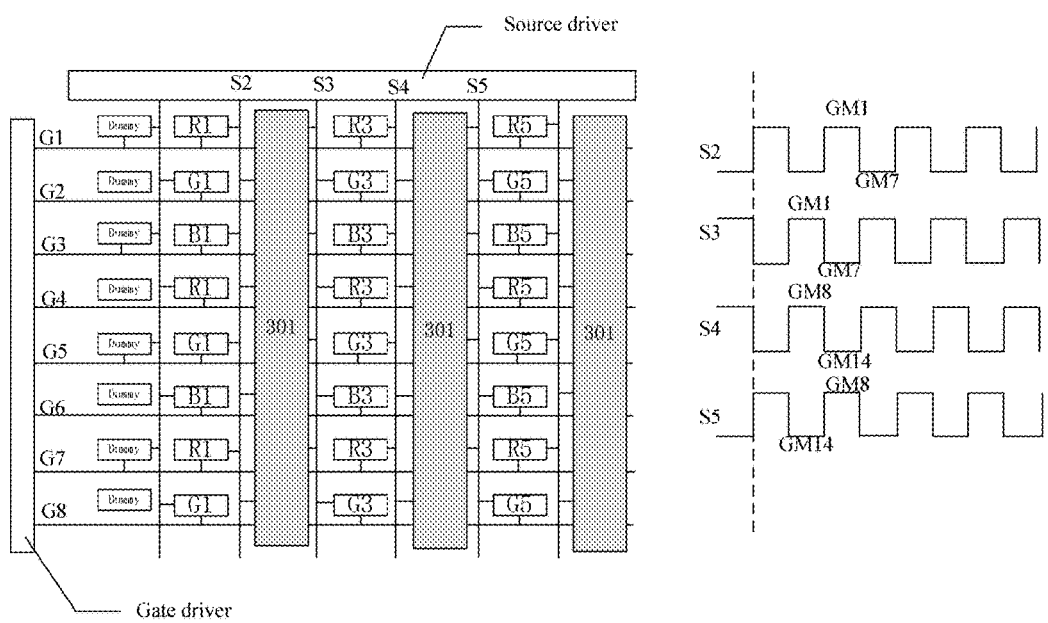
FIG. 4 is a schematic diagram of a liquid crystal display device adopting the method of driven by two rows inversion according to another preferred embodiment of the present application.

Referring to FIG. 4, FIG. 4 is a schematic diagram of the liquid crystal display device adopting the method of driven by two rows inversion according to another preferred embodiment of the present application, the image illustrated in FIG. 4 is V-stripe, the pixel in off stage (dark pixel) is illustrated in gray in FIG. 4 similarly, and the rest pixels are pixels in on stage (bright pixels). FIG. 4 illustrates another pixel arrangement structure and a partial data signal of the liquid crystal display device, in the pixel arrangement of the present embodiment, one pixel includes one red sub-pixel, one green sub-pixel, and one blue sub-pixel. In FIGS. 3, R1, R2, R3, R4, R5, and R6 are all representing red sub-pixels, G1, G2, G3, G4, G5, and G6 are all representing green sub-pixels, and B1, B2, B3, B4, B5, and B6 are all representing blue sub-pixels. Wherein gray represents dark pixels, and is shown as 301 in the figure for convenience of description. It can be seen in FIG. 4, the driving direction of the data signal S2 and the data signal S3 are in the same direction at the same time, i.e., both the data signal S2 and the data signal S3 are both at high electric level or both at the low electric level at the same time. And it can be seen in FIG. 4, the driving direction of the data signal S4 and the data signal S5 are in the same direction at the same time, i.e., both the data signal S4 and the data signal S5 are both at high electric level or both at the low electric level at the same time. At this time, the direction in which the data signal S(n+2) and the data signal S(n+3) applied to the same gate line is in contrast, resulting the signals applied to the same gate line by the data signal S(n+2) and the data signal S(n+3) are weaken by each other or even completely offset, so that the noise of the gate line is reduced, reducing the mura phenomenon when the liquid crystal display device displaying image.

Step S105, when the area in the display image corresponding to the image data having the coupling phenomenon exceeds a predetermined level is smaller than the predetermined area, the liquid crystal display device is driven by the row inversion manner, wherein when driving the liquid crystal display device by the row inversion manner, the driving direction of the data signal S(n+2) and the data signal S(n+3) is the same at the same time.

Figure 5:
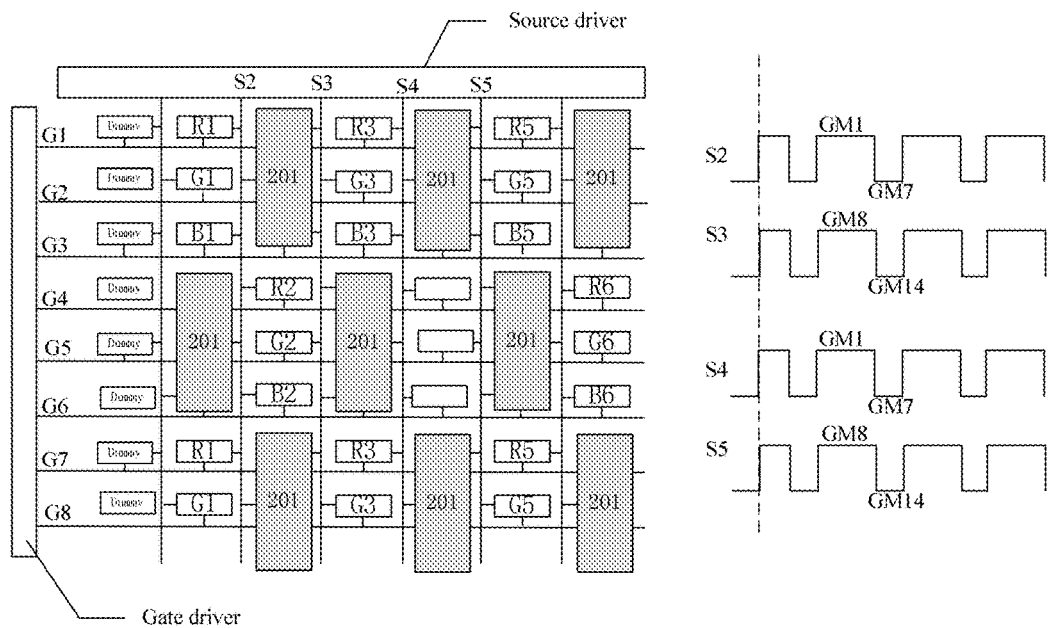
FIG. 5 is a schematic diagram of a liquid crystal display device adopting the method of driven by one row inversion in the present application.

Referring to FIG. 5, FIG. 5 is a schematic diagram of a liquid crystal display device adopting the method of driven by one row inversion in the present application; FIG. 5 illustrates a pixel arrangement structure and a partial data signal of the liquid crystal display device, in the pixel arrangement of the present embodiment, one pixel includes one red sub-pixel, one green sub-pixel, and one blue sub-pixel. In FIGS. 5, R1, R2, R3, R4, R5, and R6 are all representing red sub-pixels, G1, G2, G3, G4, G5, and G6 are all representing green sub-pixels, and B1, B2, B3, B4, B5, and B6 are all representing blue sub-pixels. Wherein gray represents dark pixels, and is shown as 201 in the figure for convenience of description. It can be seen in FIG. 5, the driving direction of the data signal S2 and the data signal S3 are in the same direction at the same time, i.e., both the data signal S2 and the data signal S3 are both at high electric level or both at the low electric level at the same time. And it can be seen in FIG. 5, the driving direction of the data signal S4 and the data signal S5 are in contrast at the same time, i.e., the data signal S4 and the data signal S5 are one at high electric level and the other at the low electric level at the same time. At this time, although the direction in which the data signal S(n+2) and the data signal S(n+3) applied to the same gate line is the same, resulting the signals applied to the same gate line by the data signal S(n+2) and the data signal S(n+3) are signal superposition, reducing the noise on the gate line is superposition.

Figure 6:
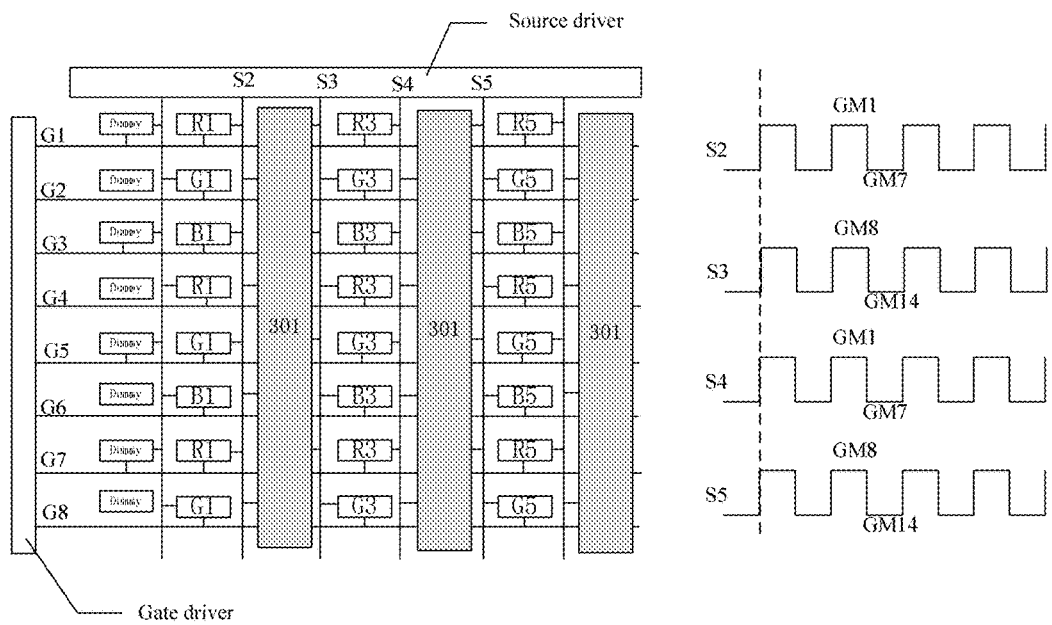
FIG. 6 is a schematic diagram of a liquid crystal display device adopting the method of driven by one row inversion in the present application.

Referring to FIG. 6, FIG. 6 is a schematic diagram of a liquid crystal display device adopting the method of driven by one row inversion in the present application; FIG. 6 illustrates a pixel arrangement structure and a partial data signal of the liquid crystal display device, in the pixel arrangement of the present embodiment, one pixel includes one red sub-pixel, one green sub-pixel, and one blue sub-pixel. In FIGS. 6, R1, R2, R3, R4, R5, and R6 are all representing red sub-pixels, G1, G2, G3, G4, G5, and G6 are all representing green sub-pixels, and B1, B2, B3, B4, B5, and B6 are all representing blue sub-pixels. Wherein gray represents dark pixels, and is shown as 301 in the figure for convenience of description. It can be seen in FIG. 6, the driving direction of the data signal S2 and the data signal S3 are in contrast at the same time, i.e., the data signal S2 and the data signal S3 are one at high electric level and the other at the low electric level at the same time. And it can be seen in FIG. 6, the driving direction of the data signal S4 and the data signal S5 are the same at the same time, i.e., both the data signal S4 and the data signal S5 are both at high electric level or both at the low electric level at the same time. At this time, although the direction in which the data signal S(n+2) and the data signal S(n+3) applied to the same gate line is the same, resulting the signals applied to the same gate line by the data signal S(n+2) and the data signal S(n+3) are signal superposition, reducing the noise on the gate line is superposition.

In one embodiment, "the step S102 of calculating the area in the display image corresponding to the image data having the coupling phenomenon exceeds a predetermined level" includes calculating the ratio with the same driving direction of the data signal S(n+2) and S(n+3) in the image data at the same time to the total data signal.

"The step S103 of determining whether the area exceeds a predetermined level in the display image corresponding to the image data having the coupling phenomenon is greater than or equal to the predetermined area" includes determining the ratio with the same driving direction of the data signal S(n+2) and S(n+3) in the image data at the same time to the total data signal is greater than or equal to the predetermined ratio.

Correspondingly, "the Step S104, when the area in the display image corresponding to the image data having the coupling phenomenon is greater than or equal to the predetermined area, the liquid crystal display device is driven by two rows inversion" includes: when the ratio with the same driving direction of the data signal S(n+2) and S(n+3) in the image data at the same time to the total data signal is greater than or equal to the predetermined ratio, the liquid crystal display device is driven in two rows inversion manner.

Correspondingly, "the Step S105, when the area in the display image corresponding to the image data having the coupling phenomenon is smaller than the predetermined area, the liquid crystal display device is driven by one row inversion" includes: when the ratio with the same driving direction of the data signal S(n+2) and S(n+3) in the image data at the same time to the total data signal is smaller than the predetermined ratio, the liquid crystal display device is driven in one row inversion manner.

Comparing to the conventional technology, the driving method of the liquid crystal display device according to the embodiment of the present application adopting the two rows inversion manner to driving the liquid crystal display device when the area in the display image corresponding to the image data having the coupling phenomenon is greater than or equal to the predetermined area, thus leading to the signals that the data signal S(n+2) and the data signal S(n+3) applied to the same gate line are in contrast, resulting the signals applied to the same gate line are weaken by each other or even completely offset, so that the noise of the gate line is reduced, reducing the mura phenomenon when the liquid crystal display device displaying image.

Figure 7:
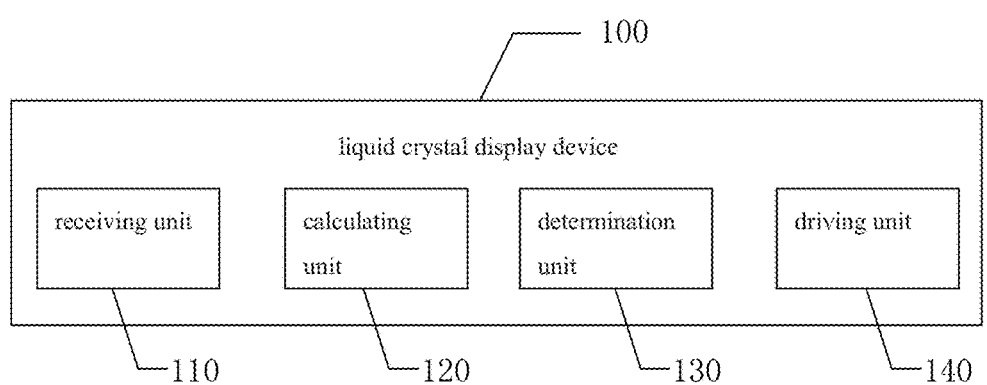
FIG. 7 is a schematic structural view of a liquid crystal display device according to a preferred embodiment of the present application.

Next, a liquid crystal display device according to the present application is described with reference to the liquid crystal display device driving method according to the present application. Referring to FIG. 7, FIG. 7 is a schematic structural view of the liquid crystal display device according to a preferred embodiment of the present application. The liquid crystal display device can be but is not limited to an electronic device such as a smart phone, an internet device, an electronic book, a portable play station, or a personal digital assistant. The liquid crystal display device 100 includes a receiving unit 110, a calculating unit 120, a determination unit 130, and a driving unit 140. The receiving unit 110, the calculation unit 120, the determination unit 130, and the driving unit 140 can be solid hardware circuits or software programs stored in a memory in the liquid crystal display device 100. The software program can be implemented by the processor of the liquid crystal display device 100 is called to perform the corresponding function. The specific functions of each unit are described in detail below.

The receiving unit 110 is configured to receive image data entered into the timing controller.

The calculation unit 120 is configured to calculate an area in the display image corresponding to the image data with a coupling phenomenon greater than a predetermined level.

The determination unit 130 is configured to determine whether the area exceeds a predetermined level in the display image corresponding to the image data having the coupling phenomenon is greater than or equal to the predetermined area.

The driving unit 140 is configured to when the area in the display image corresponding to the image data having the coupling phenomenon is greater than or equal to the predetermined area, the liquid crystal display device is driven by two rows inversion" wherein when adopting the two rows inversion manner to drive the liquid crystal display device, the driving direction of the data signal S(n+2) and the data signal S(n+3) are in contrast at the same time, wherein n is zero or a positive even number.

The driving unit 140 is further configured to when the area in the display image corresponding to the image data having the coupling phenomenon is smaller than the predetermined area, the liquid crystal display device is driven by one row inversion" wherein when adopting the one row inversion manner to drive the liquid crystal display device, the driving direction of the data signal S(n+2) and the data signal S(n+3) are the same at the same time.

In this embodiment, the calculation unit 120 is further configured to calculate the ratio with the same driving direction of the data signal S(n+2) and S(n+3) in the image data at the same time to the total data signal.

The determination unit 130 is further configured to determine the ratio with the same driving direction of the data signal S(n+2) and S(n+3) in the image data at the same time to the total data signal is greater than or equal to the predetermined ratio.

Correspondingly, the driving unit 140 is further configured to when the ratio with the same driving direction of the data signal S(n+2) and S(n+3) in the image data at the same time to the total data signal is greater than or equal to the predetermined ratio, the liquid crystal display device is driven in two rows inversion manner. Regarding the driving method of the liquid crystal display device driven by the two rows inversion, please refer specifically to the foregoing description of the liquid crystal display device driving method, and the description thereof will not be repeated here.

the driving unit 140 is further configured to when the ratio with the same driving direction of the data signal S(n+2) and S(n+3) in the image data at the same time to the total data signal is smaller than the predetermined ratio, the liquid crystal display device is driven in one row inversion manner. Regarding the driving method of the liquid crystal display device driven by the one row inversion, please refer specifically to the foregoing description of the liquid crystal display device driving method, and the description thereof will not be repeated here.

Above are embodiments of the present application, which does not limit the scope of the present application. Any modifications, equivalent replacements or improvements within the spirit and principles of the embodiment described above should be covered by the protected scope of the invention.

What is claimed is:

1. A liquid crystal display device driving method for driving the liquid crystal display device wherein the liquid crystal display device driving method comprising:
   receiving the image data entered into the timing controller;
   calculating an area in the display image corresponding to the image data having the coupling phenomenon exceeds a predetermined level;
   determining whether or not the area in the display image corresponding to the image data having the coupling phenomenon exceeds the predetermined level is greater than or equal to a predetermined area;
   when the area in the display image corresponding to the image data having the coupling phenomenon exceeds the predetermined level is greater than or equal to the predetermined area, a two rows inversion manner is adopted to drive the liquid crystal display device, wherein when the method of two rows inversion is adopted to drive the liquid crystal display device, the driving direction of the data signal S(n+2) and the data signal S(n+3) are in contrast at the same time, wherein n is zero or a positive even number;
   wherein when the area in the display image corresponding to the image data having the coupling phenomenon exceeds the predetermined level is smaller than the predetermined area, a one row inversion manner is adopted to drive the liquid crystal display device, wherein when the method of one row inversion is adopted to drive the liquid crystal display device, the driving direction of the data signal S(n+2) and the data signal S(n+3) are the same at the same time; and
   wherein the step of "calculating an area in the display image corresponding to the image data having the coupling phenomenon exceeds a predetermined level" comprising: calculating a ratio with the same driving direction of the data signal S(n+2) and S(n+3) in the image data at the same time to the total data signal.

2. The liquid crystal display device driving method according to claim 1, wherein the step of "determining whether or not the area in the display image corresponding to the image data having the coupling phenomenon exceeds a predetermined level is greater than or equal to the predetermined area" comprising: determining the ratio with the same driving direction of the data signal S(n+2) and S(n+3) in the image data at the same time to the total data signal is greater than or equal to a predetermined ratio.

3. The liquid crystal display device driving method according to claim 2, wherein the step of "when the area in the display image corresponding to the image data having the coupling phenomenon exceeds a predetermined level is greater than or equal to the predetermined area, a two rows inversion manner is adopted to drive the liquid crystal display device" comprising: when the ratio with the same driving direction of the data signal S(n+2) and S(n+3) in the image data at the same time to the total data signal is greater than or equal to the predetermined ratio, the liquid crystal display device is driven in two rows inversion manner.

4. The liquid crystal display device driving method according to claim 1, wherein the step of "determining whether or not the area in the display image corresponding to the image data having the coupling phenomenon exceeds a predetermined level is greater than or equal to the predetermined area" comprising: determining the ratio with the same driving direction of the data signal S(n+2) and S(n+3) in the image data at the same time to the total data signal is greater than or equal to a predetermined ratio.

5. The liquid crystal display device driving method according to claim 4, wherein the step of "when the area in the display image corresponding to the image data having the coupling phenomenon is smaller than the predetermined area, the liquid crystal display device is driven by one row inversion" comprising: when the ratio with the same driving direction of the data signal S(n+2) and S(n+3) in the image data at the same time to the total data signal is smaller than the predetermined ratio, the liquid crystal display device is driven in one row inversion manner.

6. A liquid crystal display device, wherein the liquid crystal display device comprising:
   a receiving unit is configured to receive image data entered into the timing controller;
   a calculation unit is configured to calculate an area in the display image corresponding to the image data with a coupling phenomenon greater than a predetermined level;
   a determination unit is configured to determine whether the area exceeds the predetermined level in the display image corresponding to the image data having the coupling phenomenon is greater than or equal to a predetermined area;
   a driving unit is configured to when the area in the display image corresponding to the image data having the coupling phenomenon is greater than or equal to the predetermined area, the liquid crystal display device is driven by two rows inversion, wherein when adopting the two rows inversion manner to drive the liquid crystal display device, the driving direction of the data signal S(n+2) and the data signal S(n+3) are in contrast at the same time, wherein n is zero or a positive even number;

wherein the driving unit is further configured to when the area in the display image corresponding to the image data having the coupling phenomenon is smaller than the predetermined area, the liquid crystal display device is driven by one row inversion, wherein when adopting the one row inversion manner to drive the liquid crystal display device, the driving direction of the data signal S(n+2) and the data signal S(n+3) are the same at the same time; and wherein the calculation unit is further configured to calculate a ratio with the same driving direction of the data signal S(n+2) and S(n+3) in the image data at the same time to the total data signal.

7. The liquid crystal display device according to claim 6, wherein the determination unit is further configured to determine the ratio with the same driving direction of the data signal S(n+2) and S(n+3) in the image data at the same time to the total data signal is greater than or equal to a predetermined ratio.

8. The liquid crystal display device according to claim 7, wherein the driving unit is further configured to when the ratio with the same driving direction of the data signal S(n+2) and S(n+3) in the image data at the same time to the total data signal is greater than or equal to the predetermined ratio, the liquid crystal display device is driven in two rows inversion manner.

9. The liquid crystal display device according to claim 6, wherein the determination unit is further configured to determine the ratio with the same driving direction of the data signal S(n+2) and S(n+3) in the image data at the same time to the total data signal is greater than or equal to a predetermined ratio.

10. The liquid crystal display device according to claim 9, wherein the driving unit is further configured to when the ratio with the same driving direction of the data signal S(n+2) and S(n+3) in the image data at the same time to the total data signal is smaller than the predetermined ratio, the liquid crystal display device is driven in one row inversion manner.

* * * * *